(12) United States Patent
Huang

(10) Patent No.: US 10,101,587 B2
(45) Date of Patent: Oct. 16, 2018

(54) DISPLAY APPARATUS

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 7 days.

(21) Appl. No.: 15/206,327

(22) Filed: Jul. 11, 2016

(65) Prior Publication Data

US 2017/0176750 A1 Jun. 22, 2017

(30) Foreign Application Priority Data

Dec. 18, 2015 (TW) .............................. 104142590 A

(51) Int. Cl.
| | |
|---|---|
| *G02B 27/14* | (2006.01) |
| *G02B 27/01* | (2006.01) |
| *G02B 13/00* | (2006.01) |
| *G02B 27/00* | (2006.01) |

(52) U.S. Cl.
CPC ..... *G02B 27/0172* (2013.01); *G02B 13/0095* (2013.01); *G02B 27/0025* (2013.01); *G02B 27/0176* (2013.01); *G02B 2027/011* (2013.01); *G02B 2027/015* (2013.01); *G02B 2027/0134* (2013.01)

(58) Field of Classification Search
CPC ............ G02B 27/0172; G02B 27/0176; G02B 27/0025; G02B 13/0095; G02B 2027/015; G02B 2027/011; G02B 2027/0134
See application file for complete search history.

(56) References Cited

U.S. PATENT DOCUMENTS

| | | |
|---|---|---|
| 5,483,307 A | 1/1996 | Anderson |
| 5,642,221 A | 6/1997 | Fischer et al. |
| 2009/0303315 A1* | 12/2009 | Charlesworth .......... G02B 7/12 |
| | | 348/61 |
| 2012/0162549 A1 | 6/2012 | Gao et al. |

FOREIGN PATENT DOCUMENTS

| | | |
|---|---|---|
| CN | 104317055 A | 1/2015 |
| CN | 104536130 A | 4/2015 |
| TW | I263831 B | 10/2006 |
| TW | 201300834 A | 1/2013 |

* cited by examiner

*Primary Examiner* — Alicia M Harrington
(74) *Attorney, Agent, or Firm* — CKC & Partners Co., Ltd.

(57) ABSTRACT

A display apparatus and a display method are disclosed. The display apparatus includes a left eye block and a right eye block. Each of the left eye and right eye block includes a relay unit and an eyepiece unit. Relay unit including at least one first optical lens is configured to receive light beams of input image, and generate a relay image by enlarging input image through the at least one first optical lens. The eyepiece unit including at least one second optical lens is configured to receive light beams of relay image, and generate an output image for a user to see by converging light beams of relay image through the at least one second optical lens.

18 Claims, 2 Drawing Sheets

DISPLAY APPARATUS

RELATED APPLICATIONS

This application claims priority to Taiwan Application Serial Number 104142590, filed Dec. 18, 2015, which is herein incorporated by reference.

BACKGROUND

Field of Invention

The present disclosure relates to a display apparatus and a display method. More particularly, the present disclosure relates to a display apparatus using micro mirrors and a display method thereof.

Description of Related Art

A head mounted display (HMD) is a stereoscopic optical display product. It casts a stereoscopic image signal with parallax configurations by a display through optical components to two eyes of user for forming a stereoscopic picture. The head mounted display worn on the head of the user utilizes a small screen for each of the eyes so as to generate the stereoscopic effect of a large image.

A head mounted display is usually applied to an augmented reality (AR) system or a virtual reality (VR) system that can move with the user and serve as an input device to receive user responses. Through the head mounted display worn on the user's head, images and text can be added to pictures generated by the user when observing the surrounding environment, thus achieving the effect of virtual reality or augmented reality.

However, not only is the current head mounted display excessively bulky, but its energy loss is also excessively high because the optical component of the current head mounted display employs a beam splitter. For the forgoing reasons, it is desirable to reduce the size of the head mounted display and to more effectively utilize the energy use of a display apparatus.

SUMMARY

A display apparatus is provided. The display apparatus comprises a left eye block and a right eye block. Each of the left eye block and the right eye block comprises a relay unit and an eyepiece unit. The relay unit comprising at least one first optical lens is configured to receive light beams of an input image and generate a relay image by enlarging the input image through the at least one first optical lens. The eyepiece unit comprising at least one second optical lens is configured to receive light beams of the relay image and generate an output image by converging the light beams of the relay image through the at least one second optical lens.

A display method suitable for aforesaid display apparatus is also provided. The display method includes steps of: receiving light beams of an input image; generating a relay image by enlarging the input image; and, generating an output image by converging light beams of the relay image.

It is to be understood that both the foregoing general descriptions and the following descriptions are by examples, and are intended to provide further explanation of the invention as claimed.

DESCRIPTION OF THE EMBODIMENTS

Figure 1:
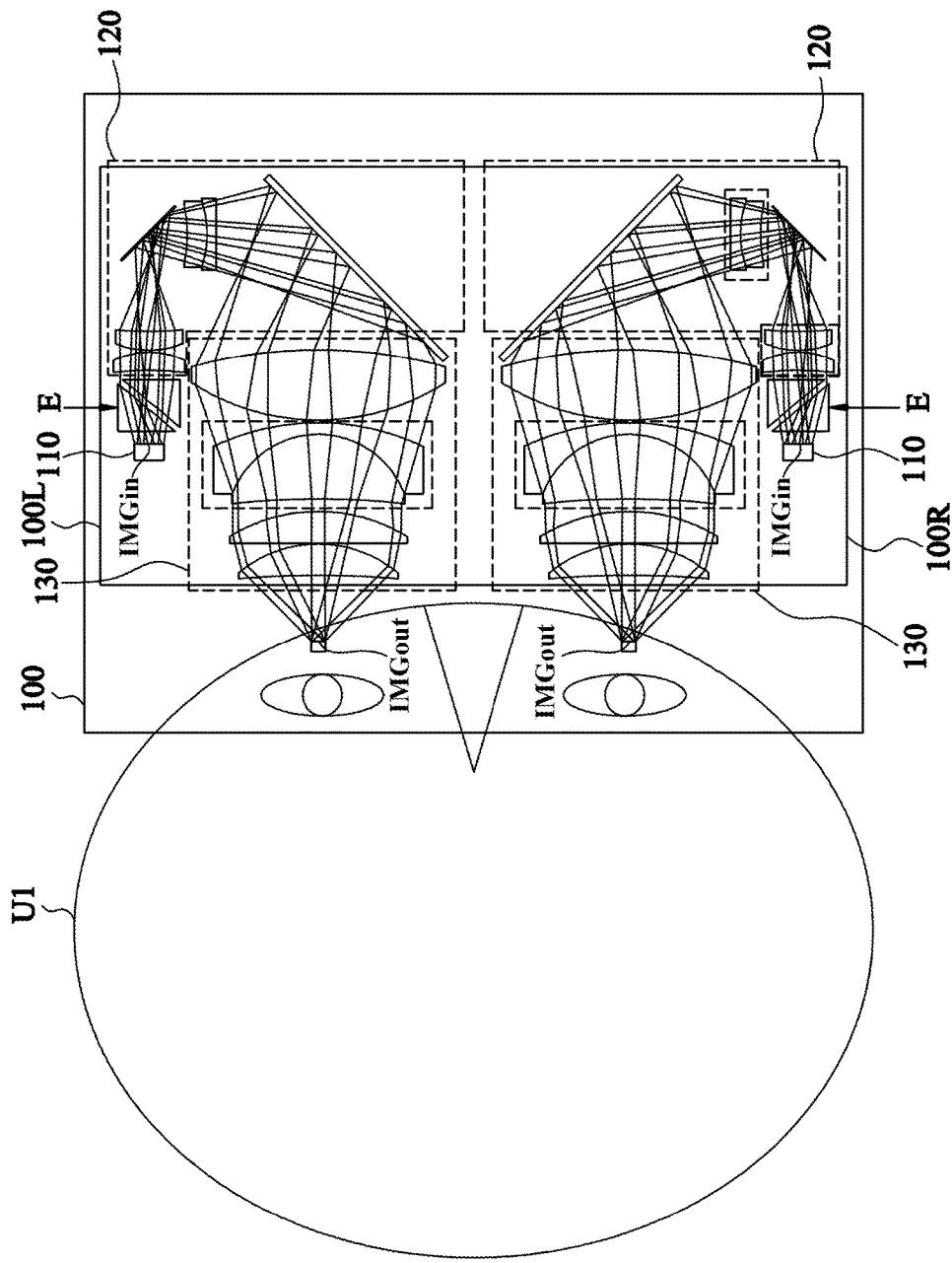
FIG. 1 depicts a schematic diagram of a display apparatus according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a display apparatus 100 is provided according to an embodiment of the present disclosure. The display apparatus 100 may be a head mounted display or any display apparatus that can be applied to augmented reality or virtual reality. As shown in FIG. 1, the display apparatus 100 comprises a left eye block 100L and a right eye block 100R. Each block comprises a micro mirror unit 110, a relay unit 120, and an eyepiece unit 130.

Figure 2:
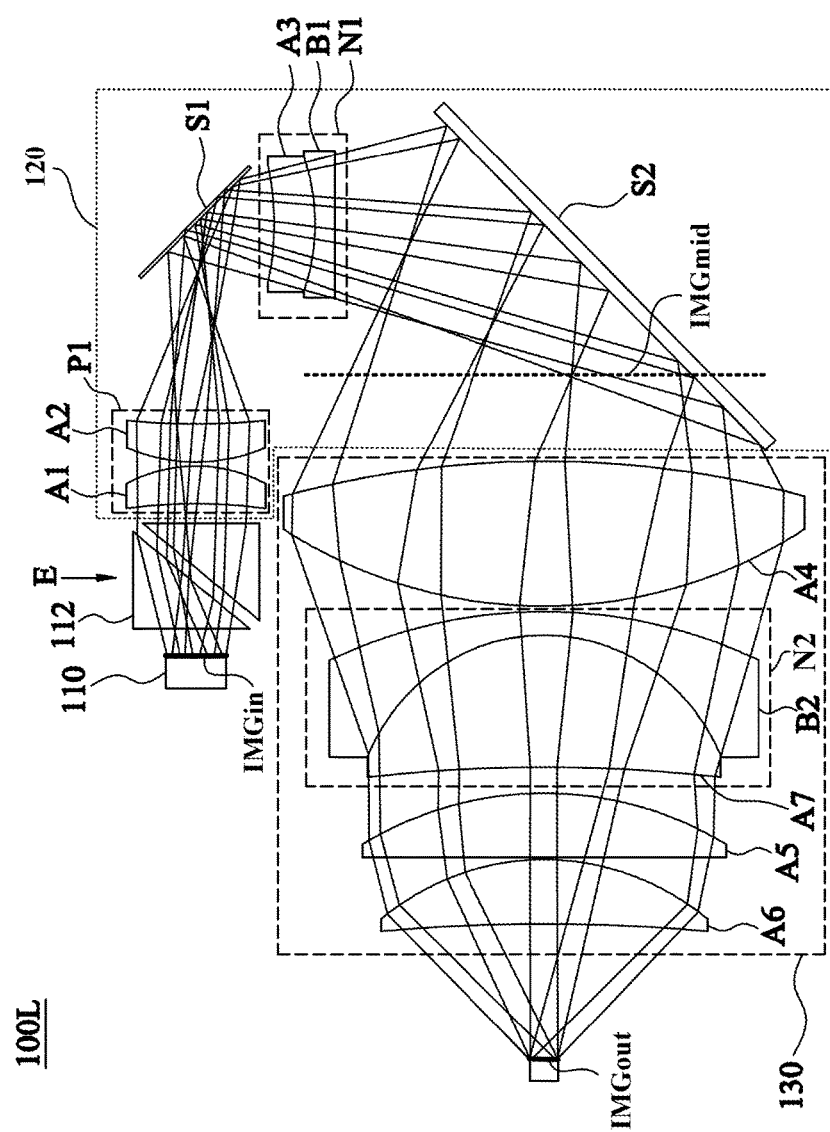
FIG. 2 depicts a schematic diagram of a left eye block of the display apparatus in FIG. 1.

The micro mirror unit 110 comprises a plurality of micro mirrors (not shown in the figure). The micro mirror unit 110 is configured to convert a light source E to an input image (input image IMGin is shown in FIG. 2) by controlling deflection angles of the micro mirrors according to an electric signal. The micro mirror unit 110 may be a digital micro mirror device (DMD) or other devices that can convert a light source to an input image.

To assist describing the details of the display apparatus's components and functions, reference is made to FIG. 2, which depicts a schematic diagram of the left eye block 100L of the display apparatus 100 in FIG. 1. Note that in practice, operations of the right eye block 100R of the display apparatus 100 are similar to operations of the left eye block 100L of the display apparatus 100.

As shown in FIG. 2, the display apparatus 100 further comprises a total reflection prism 112 disposed between the micro mirror unit 110 and the relay unit 120. The total reflection prism 112 is configured to guide beams of the light source E to the micro mirror unit 110. The micro mirror unit 110 comprises micro mirrors which can adjust the amount of reflected light through different deflection angles. For example, the micro mirror is rotated by −12 degrees in the darkest situation and rotated by +12 degrees in the brightest situation. Hence, the micro mirror unit 110 is able to convert the light source E to the input image IMGin by controlling the deflection angles of the micro mirrors according to different electric signals.

The relay unit 120 is configured to receive light beams of the input image IMGin and generate a relay image IMGmid by enlarging the input image IMGin through at least one first optical lens. The at least one first optical lens comprises a first positive lens assembly P1, a first reflecting mirror S1, a first negative lens assembly N1, and a second reflecting mirror S2. The light beams of the input image IMGin are transmitted to the first reflecting mirror S1 via the first positive lens assembly P1, reflected by the first reflecting mirror S1 to the first negative lens assembly N1, transmitting via the first negative lens assembly N1 to the second reflecting mirror S2, and then reflected by the second reflecting mirror S2 to form the relay image IMGmid.

According to an embodiment, the first positive lens assembly P1 comprises a first convex lens A1 and a second convex lens A2. The light beams of the input image IMGin are transmitted to the second convex lens A2 via the first convex lens A1, and then transmitted to the first reflecting mirror S1 via the second convex lens A2. The first negative lens assembly N1 comprises a third convex lens A3 and a first concave lens B1. The light beams of the input image IMGin are reflected to the third convex lens A3 via the first reflecting mirror S1, and then transmitted to the first concave lens B1 via the third convex lens A3, and then transmitted to the second reflecting mirror S2 via the first concave lens B1. The third convex lens A3 of the first negative lens assembly N1 may be crown glass, or some other optical glass having a low refractive index and a high Abbe number. The first concave lens B1 may be flint glass or some other optical glass having a high refractive index and a low Abbe number.

The positive lens assembly P1 of the present disclosure may be any lenses capable of converging light beams, and the negative lens assembly N1 of the present disclosure may be any lenses capable of diverging light beams. The relay image IMGmid is an enlarged image of the input image IMGin at the convergent point of light. In greater detail, the input image IMGin is refracted by the at least one first optical lens and enlarged as the relay image IMGmid. Then, points of the relay image IMGmid are respectively converted to parallel light beams by the eyepiece unit 130 and converged at a pupil of a user U1 (that is, an opening IMGout where an output image is formed and into which the output image enters). In the present embodiment, the positioning of the first reflecting mirror S1 and the second reflecting mirror S2 enables an optical axis of the first positive lens assembly P1 to be parallel to an optical axis of at least one second optical lens (provided in the eyepiece unit 130). As shown in FIG. 2, the positioning of the first reflecting mirror S1 and the second reflecting mirror S2 allows the optical axis of the first positive lens assembly P1 to be perpendicular to an optical axis of the first negative lens assembly N1; and the optical axis of the first negative lens assembly N1 to be perpendicular to the optical axis of the at least one second optical lens. For example, the first reflecting mirror S1 may be placed at a 45-degree angle to the optical axis of the first positive lens assembly P1; and the first reflecting mirror S1 and the second reflecting mirror S2 may be placed perpendicular to each other. Alternatively, in another example, the first reflecting mirror S1 may be placed at a 30-degree angle to the optical axis of the first positive lens assembly P1; and the first reflecting mirror S1 and the second reflecting mirror S2 may be similarly placed at an angle to each other, such that the optical axis of the first positive lens assembly P1 is parallel to the optical axis of the at least one second optical lens. In this manner, the optical axis of the first positive lens assembly P1 is configured to be parallel to the optical axis of the at least one second optical lens by the placement configuration of the two reflecting mirrors (the first reflecting mirror S1 and the second reflecting mirror S2), and accordingly properly utilize space to significantly reduce the size of the display apparatus 100.

The enlarged relay image IMGmid may have a non-ideal optical aberration which needs to be further eliminated by using the eyepiece unit 130. The eyepiece unit 130 is configured to receive the light beams of the relay image IMGmid, and to generate the output image by converging the light beams of the relay image IMGmid through second optical lens (disposed in the eyepiece unit 130). The output image is provided in the opening IMGout for outputting images for the user U1 to see.

Referring to FIG. 2, the eyepiece unit 130 comprises the at least one second optical lens. The at least on second optical lens comprises a fourth convex lens A4, a second negative lens assembly N2, a fifth convex lens A5, and a sixth convex lens A6. The light beams of the relay image IMGmid are transmitted through the fourth convex lens A4 to the second negative lens assembly N2, then through the second negative lens assembly N2 to the fifth convex lens A5, then through the fifth convex lens A5 to the sixth convex lens A6, then through the sixth convex lens A6 to form the output image, which enters into the opening IMGout for outputting to the User U1. In the present embodiment, the second negative lens assembly N2 comprises a second concave lens B2 and a seventh convex lens A7. The light beams of the relay image IMGmid transmits through N2 by transmitting through the second concave lens B2 and the seventh convex lens A7. The seventh convex lens A7 may be crown glass, or some other types of optical glass having a low refractive index and a high Abbe number. The second concave lens B2 may be flint glass or some other types of optical glass having a high refractive index and a low Abbe number. In this manner, optical aberration of the output image is reduced by the provision of the at least one second optical lens. In some embodiments, as shown in FIG. 2, the fourth convex lens A4 is a biconvex lens, the fifth convex lens A5 is a meniscus lens, the sixth convex lens A6 is a meniscus lens, and the seventh convex lens A7 is a meniscus lens.

The curvature design of each of the optical lenses of the at least one second optical lens may also further affect the optical aberration of the output image. FIG. 2 illustrates an example of a preferred configuration, wherein the fourth convex lens A4 has a first face that may be a convex surface, a flat surface, or a concave surface and a second face that is a convex surface. That is, a curvature radius of the first face of the fourth convex lens A4 should be smaller than a curvature radius of the second face of the fourth convex lens A4. The light beams of the relay image IMGmid are transmitted to the second face of the fourth convex lens A4 via the first face of the fourth convex lens A4, and then transmitted to the second negative lens assembly N2 via the second face of the fourth convex lens A4.

Shown in the embodiment, the second concave lens B2 has a first face that is a convex surface or a flat surface and a second face that is a concave surface. The seventh convex lens A7 has a first face that is a convex surface and a second face that may be a convex surface, a flat surface, or a concave surface. That is, a curvature radius of the first face of the second concave lens B2 should be smaller than a curvature radius of the second face of the second concave lens B2. A curvature radius of the first face of the seventh convex lens A7 should be larger than a curvature radius of the second face of the seventh convex lens A7.

The light beams of the relay image IMGmid are transmitted to the first face of the second concave lens B2 and through to the second face of the second concave lens B2, then transmitted to the first face of the seventh convex lens A7 and through, to the second face of the seventh convex lens A7, and then transmitted to the fifth convex lens A5.

The fifth convex lens A5 has a first face that is a convex surface and a second face that may be a convex surface, a flat surface, or a concave surface. That is, a curvature radius of the first face of the fifth convex lens A5 should be larger than a curvature radius of the second face of the fifth convex lens A5. The light beams of the relay image IMGmid are transmitted to the first face of the fifth convex lens A5 and through to the second face of the fifth convex lens A5, and then transmitted to the sixth convex lens A6.

The sixth convex lens A6 has a first face that is a convex surface and a second face that may be a convex surface, a flat surface, or a concave surface. That is, a curvature radius of the first face of the sixth convex lens A6 should be larger than a curvature radius of the second face of the sixth convex lens A6. The light beams of the relay image IMGmid are transmitted to the first face of the sixth convex lens A6, through the second face of the sixth convex lens A6, and then transmitted to form the output image entering into the opening IMGout. In this manner, the optical aberration of the output image may be further reduced by the provision of the lens configurations described above.

In summary, the display apparatus according to the embodiments of the present disclosure generates an output image by using optical lenses in the relay unit and the eyepiece unit. The light beams of the generated output image do not have split beam losses, and accordingly energy loss is reduced. Further, the size of the display apparatus may be reduced, and the optical aberration of the output image is also able to be reduced providing the optical lenses in favorable configurations.

It will be apparent to those skilled in the art that various modifications and variations can be made to the embodiments of the present disclosure without departing from the scope or spirit of the invention.

What is claimed is:

1. A display apparatus, comprising:
   a left eye block and a right eye block, each of the left eye block and the right eye block comprising:
   a relay unit comprising at least one first optical lens configured to receive light beams of an input image and generate a relay image by enlarging the input image through the at least one first optical lens; and
   an eyepiece unit comprising at least one second optical lens configured to receive light beams of the relay image and generate an output image by converging the light beams of the relay image through the at least one second optical lens, wherein the at least one first optical lens comprises:
   a first positive lens assembly, configured to receive the light beams of the input image;
   a first reflecting mirror, configured to receive the light beams of the input image transmitted from the first positive lens assembly and reflect the light beams of the input image;
   a first negative lens assembly, configured to receive the light beams of the input image from the first reflecting mirror; and
   a second reflecting mirror, configured to receive the light beams of the input image transmitted from the first negative lens and reflect the light beams of the input image to form the relay image.

2. The display apparatus of claim 1, wherein the first positive lens assembly comprises a first convex lens and a second convex lens, wherein the first convex lens is configured to receive the light beams of the input image and transmit to the second convex lens, and wherein the second convex lens is configured to receive the light beams of the input image from the first convex lens and transmit to the first reflecting mirror.

3. The display apparatus of claim 1, wherein the first negative lens assembly comprises a third convex lens and a first concave lens, wherein the third convex lens is configured to receive the reflected light beams of the input image from the first reflecting mirror and transmit to the first concave lens, and wherein the first concave lens is configured to receive the light beams of the input image from the third convex lens and transmit to the second reflecting mirror.

4. The display apparatus of claim 1, wherein an optical axis of the first positive lens assembly is parallel to an optical axis of the at least one second optical lens.

5. The display apparatus of claim 4, wherein the optical axis of the first positive lens assembly is perpendicular to an optical axis of the first negative lens assembly, and the optical axis of the first negative lens assembly is perpendicular to the optical axis of the at least one second optical lens.

6. The display apparatus of claim 1, wherein the at least one second optical lens comprises:
   a biconvex lens, configured to receive the light beams of the relay image;
   a second negative lens assembly, configured to receive the light beams of the relay image transmitted from the biconvex lens;
   a first meniscus lens, configured to receive the light beams of the relay image transmitted from the second negative lens assembly; and
   a second meniscus lens, configured to receive the light beams of the relay image transmitted from the first meniscus lens and transmit the light beams of the relay image to generate the output image.

7. The display apparatus of claim 6, wherein the biconvex lens comprises a first face having a convex surface, and a second face having a convex surface, wherein the first face of the biconvex lens is configured to receive the light beams of the relay image and transmit through to the second face of the biconvex lens, and wherein the second face of the biconvex lens is configured to transmit the light beams of the relay image to the second negative lens assembly.

8. The display apparatus of claim 6, wherein the first meniscus lens comprises a first face having a convex surface and a second face having a concave surface, wherein the first meniscus lens is configured to receive the light beams of the relay image from the second negative lens assembly and transmit through to the second face of the first meniscus lens, and wherein the second face of the first meniscus lens is configured to transmit the light beams of the relay image to the second meniscus lens.

9. The display apparatus of claim 6, wherein the second meniscus lens comprises a first face having a convex surface and a second face having a concave surface, wherein the second meniscus lens is configured to receive the light beams of the relay image from the first meniscus lens and transmit through to the second face of the second meniscus lens, and wherein the second face of the second meniscus lens is configured to transmit the light beams of the relay image to generate the output image.

10. The display apparatus of claim 6, wherein the second negative lens assembly comprises a concave lens and a third meniscus lens, wherein the concave lens is configured to receive the light beams of the relay image from the biconvex lens and then transmit through to the third meniscus lens, and wherein the third meniscus lens is configured to transmit the light beams of the relay image to the first meniscus lens.

11. The display apparatus of claim 10, wherein the concave lens comprises a first face having a convex surface or a flat surface, and a second face having a concave surface, wherein the first face of the concave lens is configured to receive the light beams of the relay image from the biconvex lens and transmit through to the second face of the concave lens, and wherein the second face of the concave lens is configured to transmit the light beams of the relay image to the third meniscus lens.

12. The display apparatus of claim 10, wherein the third meniscus lens comprises a first face having a convex surface and a second face having a concave surface, wherein the first face of the third meniscus lens is configured to receive the light beams of the relay image from the concave lens and transmit through to the second face of the third meniscus lens, and wherein the second face of the third meniscus lens is configured to transmit the light beams of the relay image to the first meniscus lens.

13. A display method, comprising:
receiving light beams of an input image;
generating a relay image by enlarging the input image; and
generating an output image by converging light beams of the relay image,
wherein the display method is suitable for a display apparatus comprising a left eye block and a right eye block, each of the left eye block and the right eye block comprises a relay unit, the relay unit comprises a first positive lens assembly, a first reflecting mirror, a first negative lens assembly and a second reflecting mirror, the step of generating a relay image by enlarging the input image further comprising:
transmitting the light beams of the input image from the first positive lens assembly to the first reflecting mirror;
reflecting the light beams of the input image by the first reflecting mirror to the first negative lens assembly;
transmitting the light beams of the input image from the first negative lens assembly to the second reflecting mirror; and
reflecting the light beams of the input image by the second reflecting mirror to form the relay image.

14. The display method of claim 13, wherein the first positive lens assembly comprises a first convex lens and a second convex lens, the display method further comprising:
receiving the light beams of the input image by the first convex lens and transmitting the light beams of the input image to the second convex lens; and
receiving the light beams of the input image by the second convex lens and transmitting the light beams of the input image to the first reflecting mirror.

15. The display method of claim 13, wherein the first negative lens assembly comprises a third convex lens and a first concave lens, the display method further comprising:
receiving the light beams of the input image by the third convex lens from the first reflecting mirror and transmitting the light beams of the input image to the first concave lens; and
receiving the light beams of the input image by the first concave lens and transmitting the light beams of the input image to the second reflecting mirror.

16. The display method of claim 13, further comprising providing the display apparatus with an eyepiece unit comprising at least one second optical lens configured to receive light beams of the relay image;
generating an output image by converging the light beams of the relay image through the at least one second optical lens; and
arranging the first positive lens assembly and the at least one second optical lens such that an optical axis of the first positive lens assembly is parallel to an optical axis of the at least one second optical lens.

17. The display method of claim 16, further comprising:
arranging the first positive lens assembly, the first negative lens assembly, and the at least one second optical lens such that the optical axis of the first positive lens assembly is perpendicular to an optical axis of the first negative lens assembly; and the optical axis of the first negative lens assembly is perpendicular to the optical axis of the at least one second optical lens.

18. The display method of claim 13, further comprising:
providing each of the left eye block and the right eye block with an eyepiece unit each comprising a biconvex lens, a second negative lens assembly, a first meniscus lens and a second meniscus lens, wherein
the step of generating an output image by converging light beams of the relay image comprises:
receiving the light beams of the relay image by the biconvex lens;
transmitting the light beams of the relay image from the biconvex lens to the second negative lens assembly;
transmitting the light beams of the relay image from the second negative lens to the first meniscus lens;
transmitting the light beams of the relay image from the first meniscus lens to the second meniscus lens; and
generating the output image by the second meniscus lens.

* * * * *